United States Patent
Hsieh

(10) Patent No.: US 8,283,938 B2
(45) Date of Patent: Oct. 9, 2012

(54) MONITORING SYSTEM AND INPUT AND OUTPUT DEVICE THEREOF

(75) Inventor: Ming-Chih Hsieh, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 402 days.

(21) Appl. No.: 12/781,951

(22) Filed: May 18, 2010

(65) Prior Publication Data

US 2011/0224929 A1 Sep. 15, 2011

(51) Int. Cl.
*G01R 27/00* (2006.01)
*G05B 23/02* (2006.01)

(52) U.S. Cl. .......................... 324/713; 340/3.1
(58) Field of Classification Search ............... 324/713, 324/73.1, 158.1; 340/3.1, 3.43, 3.44, 3.5
See application file for complete search history.

(56) References Cited

U.S. PATENT DOCUMENTS 4,988,988 A * 1/1991 Kimura ..................... 340/3.44
5,512,890 A * 4/1996 Everson et al. .......... 340/870.13

* cited by examiner

*Primary Examiner* — Vincent Q Nguyen
(74) *Attorney, Agent, or Firm* — Altis Law Group, Inc.

(57) ABSTRACT

A monitoring system includes a controller, a number of input and output devices, a number of sensors, and a number of electronic devices. Each input and output device includes a switching circuit, a first input circuit, a second input circuit, and a connector. The connector is connected to a sensor or an electronic device. The controller controls the switching circuit to receive a detecting signal of the sensor or supply power to the electronic device. The first input circuit and the second input circuit are connected between the switching circuit and the controller.

14 Claims, 4 Drawing Sheets

MONITORING SYSTEM AND INPUT AND OUTPUT DEVICE THEREOF

CROSS-REFERENCE

Relevant subject matter is disclosed in six co-pending U.S. patent applications (Ser. Nos. 12/641,230, 12/781,927, 12/781,933, 12/770,779, 12/781,940, and 12/781,854) assigned to the same assignee as this patent application.

BACKGROUND

1. Technical Field

The present disclosure relates to monitoring systems and, particularly, to a monitoring system with input and output devices.

2. Description of Related Art

In a monitoring system, input devices input detecting signals from sensors to a controller, and output devices supply power to electronic devices. The input devices and output devices are integrated into the monitoring system and the number of input and output devices is fixed. As a result, it is inconvenient to modify such a monitoring system to expand its input and output capability.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings in which like references indicate similar elements is illustrated by way of example and not by way of limitation. It should be noted that references to "an" or "one" embodiment in this disclosure are not necessarily to the same embodiment, and such references mean at least one.

Figure 1:
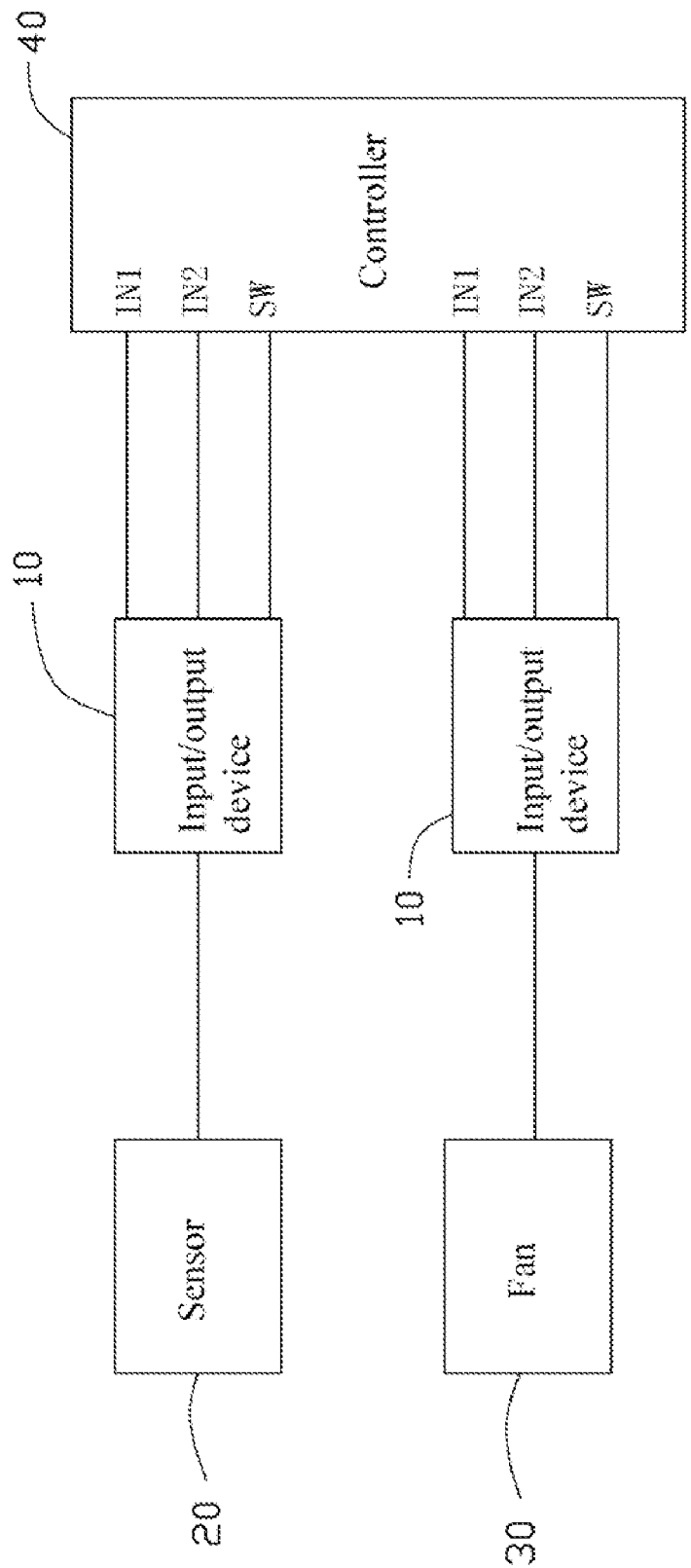
FIG. 1 is a schematic block diagram of an exemplary embodiment of a monitoring system, the monitoring system including input and output devices.

Referring to FIG. 1, an exemplary embodiment of a monitoring system 1 includes two input and output (I/O) devices 10, a sensor 20, an electronic device, and a controller 40. In another embodiment, the monitoring system 1 may include a plurality of I/O devices 10, a plurality of sensors 20, a plurality of electronic devices, and a controller 40. In the embodiment, the sensors 20 are temperature sensors and the electronic devices are fans 30. A sum of the sensors 20 and the fans 30 is equal to the number of the I/O devices 10.

The controller 40 includes a plurality of first input terminals IN1, a plurality of second input terminals IN2, and a plurality of control terminals SW.

Each I/O device 10 is connected between one of the sensors 20 or one of the fans 30, and the controller 40.

When an I/O device 10 is connected to one of the sensors 20, the I/O device 10 functions as an input device to convert a detecting signal from the sensor 20 to a voltage signal and transmit the voltage signal to the controller 40. When the I/O device 10 is connected to one of the fans 30, the I/O device 10 functions as an output device to supply power to the fan 30.

Figure 2:
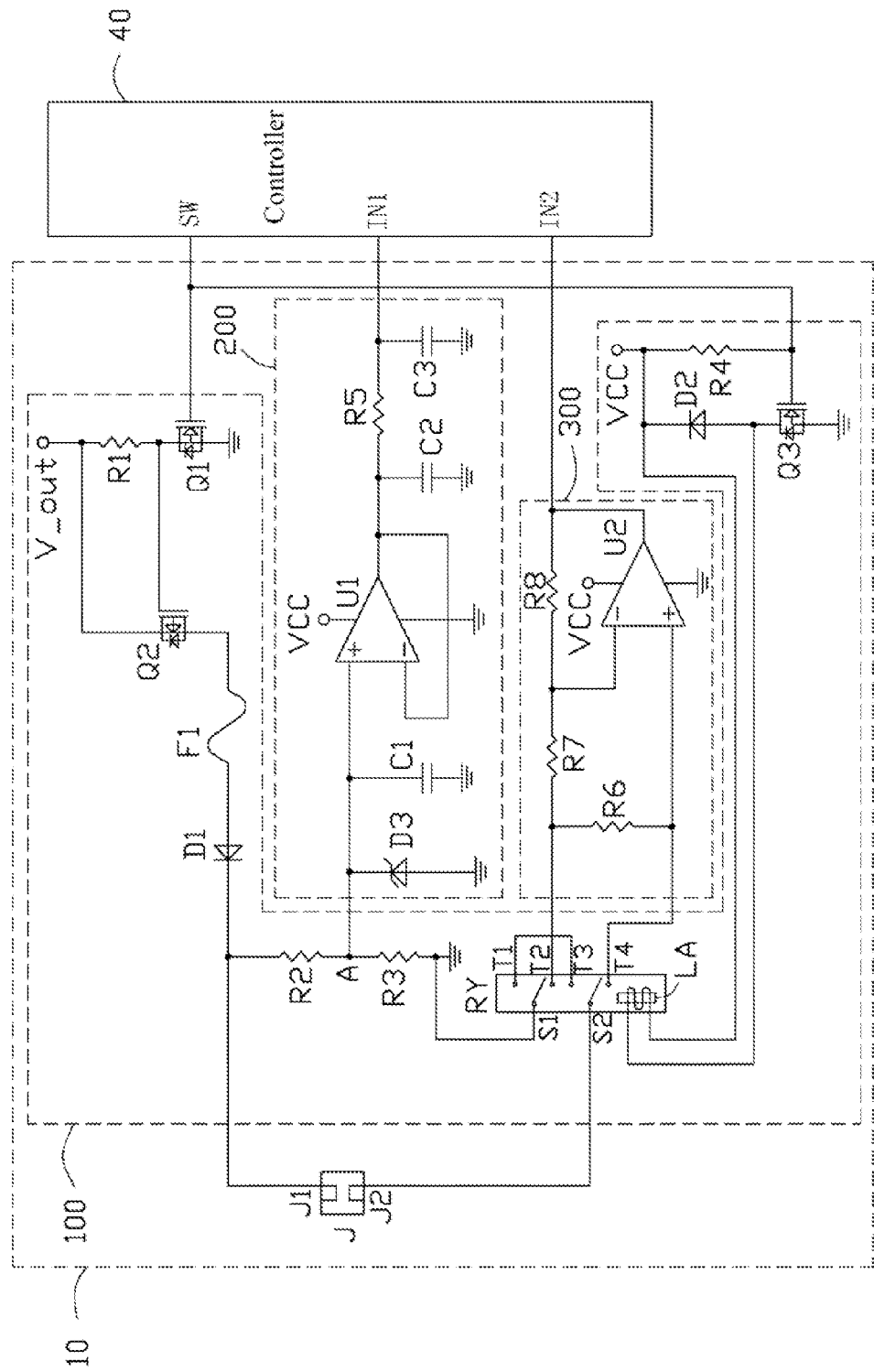
FIG. 2 is a schematic diagram of one of the input and output devices of FIG. 1.

Referring to FIG. 2, the input device 10 includes a switching circuit 100, a first input circuit 200, a second input circuit 300, and a connector J. The switching circuit 100 is connected between a control terminal SW of the controller 40 and the connector J. The first input circuit 200 is connected between the switching circuit 100 and a first input terminal IN1 of the controller 40. The second input circuit 300 is connected between the switching circuit 100 and a second input terminal IN2 of the controller 40. The connector J is connected to the sensor 20 or the fan 30.

When the I/O device 10 functions as an input device, the second input circuit 300 does not work. The switching circuit 100 converts the detecting signal of the sensor 20 to a voltage signal. The first input circuit 200 transmits the voltage signal of the switching circuit 100 to the controller 40. When the I/O device 10 functions as an output device, the switching circuit 100 supplies power to the fan 30. The controller 40 detects the voltage across the fan 30 via the first input circuit 200 and detects the current of the fan 30 via the second input circuit 300.

The switching circuit 100 includes a first metal-oxide-semiconductor field effect transistor (MOSFET) Q1, a second MOSFET Q2, a third MOSFET Q3, a fuse F1, a first diode D1, a second diode D2, a relay RY, and resistors R1-R4. The first MOSFET Q1 and the third MOSFET Q3 are n-channel MOSFETs. The second MOSFET Q2 is a p-channel MOSFET.

A drain of the first MOSFET Q1 is connected to a power source V_out via the resistor R1. A gate of the first MOSFET Q1 is connected to the control terminal SW of the controller 40. A source of the first MOSFET Q1 is grounded. A gate of the second MOSFET Q2 is connected to the drain of the first MOSFET Q1. A source of the second MOSFET Q2 is connected to the power source V_out.

An anode of the diode D1 is connected to a drain of the second MOSFET Q2 via the fuse F1. A cathode of the diode D1 is connected to a first terminal J1 of the connector J. A first terminal of the resistor R3 is connected to the first terminal J1 of the connector J via the resistor R2. A second terminal of the resistor R3 is grounded.

The relay RY includes a coil LA, a first selecting terminal S1, a second selecting terminal S2, and contacts T1-T4. The first selecting terminal S1 is grounded. The second selecting terminal S2 is connected to a second terminal J2 of the connector J. The contact T1 is connected to the contact T3. The first selecting terminal S1 contacts the contact T1 and the second selecting terminal S2 contacts the contact T3 in the absence of current flowing through the coil LA. The first selecting terminal S1 contacts the contact T2 and the second selecting terminal S2 contacts the contact T4 in the presence of current flowing through the coil LA.

A first terminal of the coil LA is connected to a power source VCC. A second terminal of the coil LA is connected to a drain of the third MOSFET Q3. A gate of the third MOSFET Q3 is connected to the control terminal SW of the controller 40. The gate of the third MOSFET Q3 is also connected to the power source VCC via the resistor R4. A source of the third MOSFET Q3 is grounded. An anode of the second diode D2 is connected to the drain of the third MOSFET Q3. A cathode of the second diode D2 is connected to the power source VCC.

The first input circuit 200 includes a voltage stabilizing diode D3, an operational amplifier (opamp) U1, a resistor R5, and capacitors C1-C3.

A cathode of the voltage stabilizing diode D3 is connected to a node A between the resistors R2 and R3. An anode of the voltage stabilizing diode D3 is grounded.

A non-inverting input of the opamp U1 is connected to the node A, and grounded via the capacitor C1. An inverting input of the opamp U1 is connected to an output of the opamp U1. A power terminal of the opamp U1 is connected to the power source VCC. A ground terminal of the opamp U1 is grounded. The output of the opamp U1 is also grounded via the capacitor C2.

A first terminal of the resistor R5 is connected to the output of the opamp U1. A second terminal of the resistor R5 is connected to the first input terminal IN1 of the controller 40 and grounded via the capacitor C3. The resistor R5, and the capacitors C2 and C3 compose a pi-type filter to filter high frequency signals from the output of the opamp U1.

The second input circuit 300 includes an opamp U2, and resistors R6-R8.

A first terminal of the resistor R6 is connected to the contact T2 of the relay RY. A second terminal of the resistor R6 is connected to the contact T4 of the relay RY. A non-inverting input of the opamp U2 is connected to the contact T4 of the relay RY. An inverting input of the opamp U2 is connected to the contact T2 of the relay RY via the resistor R7. An output of the opamp U2 is connected to the inverting input of the opamp U2 via the resistor R8. The output of the opamp U2 is also connected to the second input terminal IN2 of the controller 40. A power terminal of the opamp U2 is connected to the power source VCC. A ground terminal of the opamp U2 is grounded.

Figure 3:
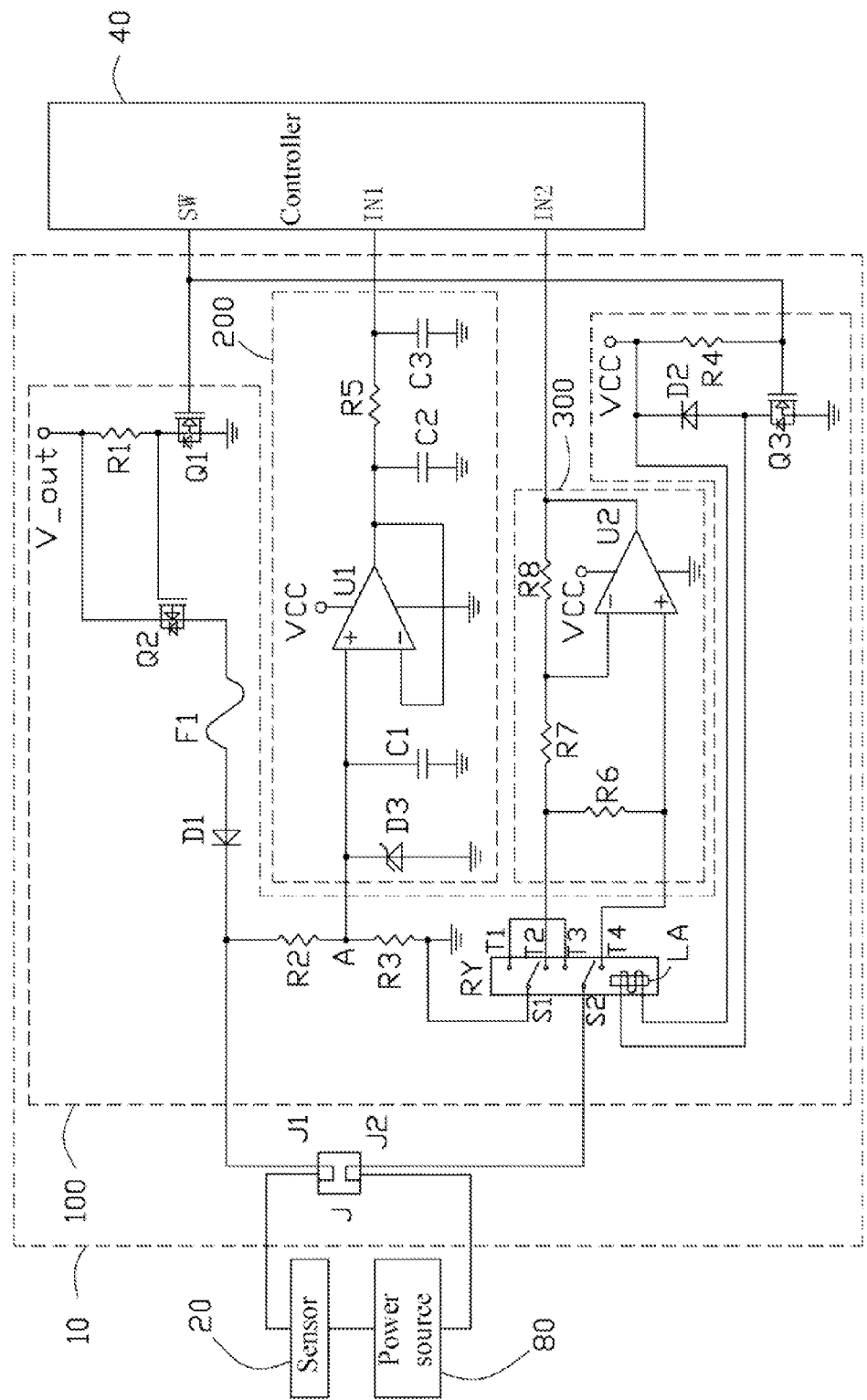
FIG. 3 is a schematic circuit diagram of one of the input and output devices of FIG. 2, functioning as an input device and connected to a sensor.

Referring to FIG. 3, when the first terminal J1 of the connector J, one of the sensors 20, a power source 80, and the second terminal J2 of the connector J are connected in series, the control terminal SW of the controller 40 is set at a low voltage level. The first MOSFET Q1 of the switching circuit 100 is turned off. The gate of the second MOSFET Q2 is at a high voltage level. The second MOSFET Q2 is turned off. At the same time, the third MOSFET Q3 is turned off. No current passes through the coil LA. The first selecting terminal S1 contacts the contact T1 and the second selecting terminal S2 contacts the contact T3. The sensor 20, the power source 80, the resistor R3, and the resistor R2 compose a loop.

The sensor 20 detects temperature, and the voltage Vb of the node between the resistor R2 and the first terminal J1 of the connector J changes corresponding to changing of the temperature. The relationship of the voltage Vb of the node between the resistor R2 and the first terminal J1 of the connector J, the voltage Va of the node A, resistances of the resistors R2 and R3 is shown below.

$$Va = Vb \times R3/(R2+R3)$$

The first input terminal IN1 of the controller 40 receives the output of the opamp U1 via the resistor R5. The output of the opamp U1 is approximately equal to the input voltage Va. The controller 40 stores a plurality of voltage values and a plurality of corresponding temperature values. The controller 40 determines temperature of the sensor 20 by comparing the input voltage Va with the temperature values.

Figure 4:
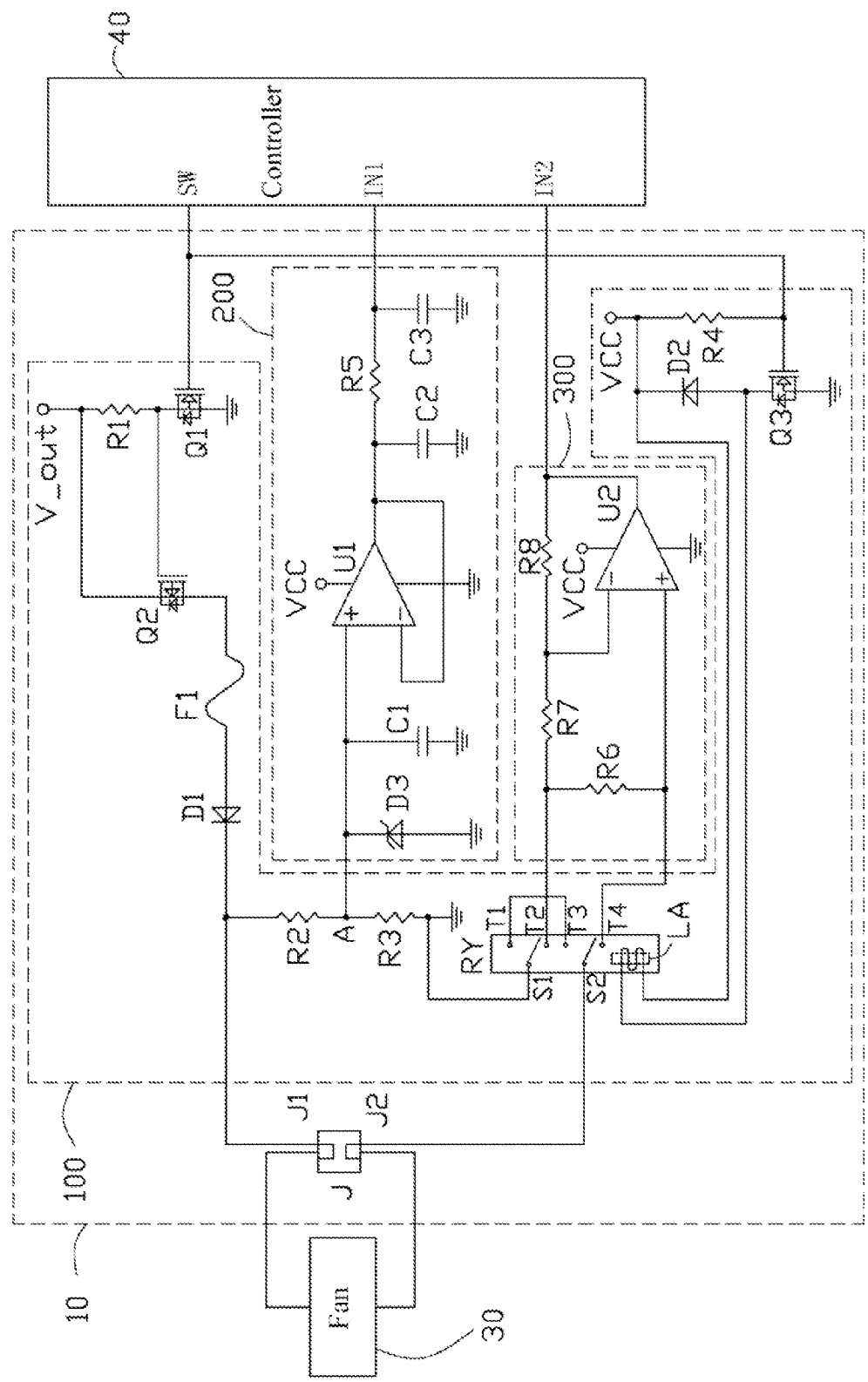
FIG. 4 is a schematic circuit diagram of one of the input and output devices of FIG. 2, functioning as an output device and connected to a fan.

Referring to FIG. 4, when the first terminal J1 of the connector J, one of the fans 30, and the second terminal J2 of the connector J are connected in series, the control terminal SW of the controller 40 is set at a high voltage level. The first MOSFET Q1 of the switching circuit 100 is turned on. The gate of the second MOSFET Q2 is at a low voltage level. The second MOSFET Q2 is turned on. The power source V_out is connected to the fan 30 via the second MOSFET Q2, the fuse F1, the first diode D1, and the connector J in series. At the same time, the third MOSFET Q3 is turned on. Current flows through the coil LA. The first selecting terminal S1 contacts the contact T2 and the second selecting terminal S2 contacts the contact T4.

The controller 40 detects the voltage of the fan 30 via the first input circuit 200. The relationship of the voltage Vb of the node between the resistor R2 and the first terminal J1 of the connector J, the voltage Va of the node A, resistances of the resistors R2 and R3 is shown below.

$$Va = Vb \times R3/(R2+R3).$$

The first input terminal N1 of the controller 40 receives the output of the opamp U1 via the resistor R5. The output of the opamp U1 is approximately equal to the input voltage Va. The controller 40 detects the voltage across the fan 30 by detecting the input voltage Va.

The controller 40 detects the current flowing through the fan 30 via the second input circuit 300.

The second input terminal IN2 of the controller 40 receives the output of the opamp U2. The controller 40 detects the current flowing through the resistor R6 by detecting the voltage signal of the node between the resistor R6 and the contact T4.

The foregoing description of the exemplary embodiments of the disclosure has been presented only for the purposes of illustration and description and is not intended to be exhaustive or to limit the disclosure to the precise forms disclosed. Many modifications and variations are possible in light of the above everything. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. A monitoring system, comprising:
a controller comprising a plurality of first input terminals, a plurality of second input terminals, and a plurality of control terminals;
a plurality of sensors;
a plurality of electronic devices; and
a plurality of input and output (I/O) devices, wherein a sum of the sensors and the electronic devices is equal to a number of the I/O devices, each I/O device is connected between the controller and one of the sensors or one of the electronic devices, each I/O device comprises a switching circuit, a first input circuit, a second input circuit, and a connector, the connector is connected to one of the sensors or connected to one of the electronic devices, the switching circuit is connected between the connector and the control terminal of the controller, the first input circuit is connected between the switching circuit and the first input terminal of the controller, the second input circuit is connected between the switching circuit and the second input terminal of the controller, wherein the controller outputs a control signal to the switching circuit and controls the I/O device to function as an input device or an output device, wherein when the I/O device functions as an input device, the switching circuit converts a detecting signal of the sensor to a voltage signal, the first input circuit transmits the voltage signal to the controller; wherein when the I/O device functions as an output device, the switching circuit supplies power to the electronic device and the controller detects the voltage across the electronic device via the first input circuit and detects the current flowing through the electronic device via the second input circuit.

2. The monitoring system of claim 1, wherein the sensors are temperature sensors.

3. The monitoring system of claim 1, wherein the electronic devices are fans.

4. The monitoring system of claim 1, wherein the switching circuit comprises a first metal-oxide-semiconductor field effect transistor (MOSFET), a second MOSFET, a third MOSFET, a relay, a first resistor, a second resistor, a third resistor, a fourth resistor, and a fifth resistor, a drain of the first MOSFET is connected to a first power source via the first resistor, a gate of the first MOSFET is connected to the control terminal of the controller, a source of the first MOSFET is grounded, a gate of the second MOSFET is connected to the drain of the first MOSFET, a source of the second MOSFET is connected to the first power source, a drain of the second MOSFET Q2 is connected to a first terminal of the connector, a first terminal of the third resistor is connected to the first terminal of the connector via the second resistor, a second terminal of the third resistor is grounded, the relay comprises a coil, a first selecting terminal, a second selecting terminal, a first contact, a second contact, a third contact, and a fourth contact, the first selecting terminal is grounded, the second selecting terminal is connected to a second terminal of the connector, the first contact is connected to the third contact, the second contact is connected to the fourth contact via the fourth resistor, a first terminal of the coil is connected to a second power supply, a second terminal of the coil is connected to a drain of the third MOSFET, a gate of the third MOSFET is connected to the control terminal of the controller and connected to the second power supply via the fifth resistor, a source of the third MOSFET is grounded.

5. The monitoring system of claim 4, wherein the first input circuit comprises a voltage stabilizing diode, a first operational amplifier (opamp), and a sixth resistor, a cathode of the voltage stabilizing diode is connected to a node between the second resistor and the third resistor, an anode of the voltage stabilizing diode is grounded, a non-inverting input of the first opamp is connected to the cathode of the voltage stabilizing diode, an inverting input of the first opamp is connected to an output of the first opamp, a first terminal of the sixth resistor is connected to the output of the first opamp, a second terminal of the sixth resistor is connected to the first input terminal of the controller.

6. The monitoring system of claim 4, wherein the second input circuit comprises a second opamp, a sixth resistor, and a seventh resistor, a non-inverting input of the second opamp is connected to the fourth contact of the relay, an inverting input of the second opamp is connected to the second contact of the relay via the sixth resistor, an output of the opamp is connected to the inverting input of the second opamp via the seventh resistor and connected to the second input terminal of the controller.

7. The monitoring system of claim 4, wherein the drain of the second MOSFET Q2 is connected to the first terminal of the connector via a fuse.

8. The monitoring system of claim 4, wherein the drain of the second MOSFET Q2 is connected to the first terminal of the connector via a diode, an anode of the diode is connected to the drain of the second MOSFET Q2, a cathode of the diode is connected to the first terminal of the connector.

9. An input and output (I/O) device connected between a controller and a sensor or an electronic device, the I/O device comprising:
a connector connected to the sensor or the electronic device;
a switching circuit connected between a control terminal of the controller and the connector, wherein the switching circuit receives a control signal of the controller and functions as an input device or an output device according to the control signal, wherein when the I/O device functions as an input device, the switching circuit converts a detecting signal of the sensor to a voltage signal; wherein when the I/O device functions as an output device, the switching circuit supplies power to the electronic device;
a first input circuit connected between the switching circuit and a first input terminal of the controller, wherein when the I/O device functions as an input device, the first input circuit transmits the voltage signal of the switching circuit to the controller; wherein when the I/O device functions as an output device, the controller detects the voltage across the electronic device via the first input circuit; and
a second input circuit connected between the switching circuit and a second input terminal of the controller, wherein when the I/O device functions as an output device, the controller detects the current flowing through the electronic device via the second input circuit.

10. The I/O device of claim 9, wherein the switching circuit comprises a first metal-oxide-semiconductor field effect transistor (MOSFET), a second MOSFET, a third MOSFET, a relay, first to fifth resistors, a drain of the first MOSFET is connected to a first power source via the first resistor, a gate of the first MOSFET is connected to the control terminal of the controller, a source of the first MOSFET is grounded, a gate of the second MOSFET is connected to the drain of the first MOSFET, a source of the second MOSFET is connected to the first power source, a drain of the second MOSFET Q2 is connected to a first terminal of the connector, a first terminal of the third resistor is connected to the first terminal of the connector via the second resistor, a second terminal of the third resistor is grounded, the relay comprises a coil, a first selecting terminal, a second selecting terminal, first to fourth contacts, the first selecting terminal is grounded, the second selecting terminal is connected to a second terminal of the connector, the first contact is connected to the third contact, the second contact is connected to the fourth contact via the fourth resistor, a first terminal of the coil is connected to a second power supply, a second terminal of the coil is connected to a drain of the third MOSFET, a gate of the third MOSFET is connected to control terminal of the controller and connected to the second power supply via the fifth resistor, a source of the third MOSFET is grounded.

11. The I/O device of claim 10, wherein the first input circuit comprises a voltage stabilizing diode, a first operational amplifier (opamp), and a sixth resistor, a cathode of the voltage stabilizing diode is connected to a node between the second resistor and the third resistor, an anode of the voltage stabilizing diode is grounded, a non-inverting input of the first opamp is connected to the cathode of the voltage stabilizing diode, an inverting input of the first opamp is connected to an output of the first opamp, a first terminal of the sixth resistor is connected to the output of the first opamp, a second terminal of the sixth resistor is connected to the first input terminal of the controller.

12. The I/O device of claim 10, wherein the second input circuit comprises a second opamp, a sixth resistor, and a seventh resistor, a non-inverting input of the second opamp is connected to the fourth contact of the relay, an inverting input of the second opamp is connected to the second contact of the relay via the sixth resistor, an output of the second opamp is connected to the inverting input of the second opamp via the seventh resistor and connected to the second input terminal of the controller.

13. The monitoring system of claim 10, wherein the drain of the second MOSFET Q2 is connected to the first terminal of the connector via a fuse.

14. The monitoring system of claim 10, wherein the drain of the second MOSFET Q2 is connected to the first terminal of the connector via a diode, an anode of the diode is connected to the drain of the second MOSFET Q2, a cathode of the diode is connected to the first terminal of the connector.

* * * * *

UNITED STATES PATENT AND TRADEMARK OFFICE
CERTIFICATE OF CORRECTION

PATENT NO. : 8,283,938 B2  
APPLICATION NO. : 12/781951  
DATED : October 9, 2012  
INVENTOR(S) : Ming-Chih Hsieh Page 1 of 1

It is certified that error appears in the above-identified patent and that said Letters Patent is hereby corrected as shown below:

Title Page, below Item (65) insert

-- (30)   Foreign Application Priority Data

Mar. 9, 2010   (CN) ...............................201010120876.1 --

Signed and Sealed this  
Twentieth Day of May, 2014

Michelle K. Lee  
*Deputy Director of the United States Patent and Trademark Office*